United States Patent
Eberts

[15] 3,692,087
[45] Sept. 19, 1972

[54] METALLIC POROUS PLATES

[72] Inventor: Robert E. Eberts, Framingham, Mass.

[73] Assignee: Norton Company, Worchester, Mass.

[22] Filed: March 17, 1969

[21] Appl. No.: 807,814

[52] U.S. Cl. ..................164/46, 117/107, 148/6.14
[51] Int. Cl. ....B22d 23/00, C23c 13/00, C23c 13/02
[58] Field of Search ..........117/107, 107.1; 148/6.14; 164/46

[56] References Cited

UNITED STATES PATENTS

| | | |
|---|---|---|
| 3,181,209 | 5/1965 | Smith, Jr. .....................164/46 |
| 3,401,736 | 9/1968 | Imogawa .....................164/46 |
| 2,409,295 | 10/1946 | Marvin et al...........117/107 X |
| 3,022,187 | 2/1962 | Eyraud et al...........117/107 X |
| 3,355,320 | 11/1967 | Spriggs et al...........117/107 X |
| 3,390,026 | 6/1968 | Cerych et al...........117/107 X |

Primary Examiner—Alfred L. Leavitt
Assistant Examiner—Kenneth P. Glynn
Attorney—Oliver W. Hayes and Jerry Cohen

[57] ABSTRACT

Porous plates made by vacuum evaporation of metal at relatively low vacuum levels. Such plates can be removed from the substrate for use. The pores in the porous structure so produced may be enlarged by etching.

3 Claims, 9 Drawing Figures

PATENTED SEP 19 1972　　3,692,087

INVENTOR
ROBERT E. EBERTS

BY Oliver W. Hayes and
Jerry Cohen
ATTORNEYS

INVENTOR
ROBERT E. EBERTS

INVENTOR
ROBERT E. EBERTS

METALLIC POROUS PLATES

The present invention relates to production of fluid (gas and liquid) permeable, porous plate elements for use in filtering, sorption, reverse osmosis, back-up plates, fuel cell electrodes and like applications.

Porous plate elements of this character have been the subject of intensive research and development for several years. Currently used materials are made of organic materials, felted or woven glass fibers and sintered or compacted metal powders and fibers. Each type has certain limitations and restrictions. For instance, organic materials are likely to compress under pressure and thus lose their permeability; they also must be used at relatively low pressures to prevent bursting. It is difficult to make porous glass fiber materials with sufficiently small pore sizes and in sufficiently thin sections. The uniformity of pore size is difficult to control in metal powder compacts and thickness is generally greater than desired.

It is the object of the present invention to provide an improved permeable porous plate element of this character having pore size less than $0.1 \times 10^{-6}$ meter (0.1 micron) with minimum sheet thickness consistent with high permeability and high resistance to temperature, corrosion and pressure.

It is a further object of the invention to provide such an element with controlled pore size within the desired low range of pore size while maintaining a useful, desirable level of permeability.

It is a further object of the invention to provide a method of readily manufacturing such plates.

Other objects, features and advantages of the invention will in part be explained in, and will in part be obvious from the following description of the invention.

GENERAL DESCRIPTION

The invention is based on the recognition that the conditions which give rise to very poor metal coatings in vacuum coating practice or stray deposits of powdery or porous coatings on vacuum coating chamber walls can be defined and adjusted to produce porous elements of the character described above. To test this hypothesis, a vacuum coater was deliberately run under several sets of conditions amounting to poor vacuum coating practice and it was observed that metal coatings could be produced on a substrate—either adherent to or easily removable from the substrate, as desired—which would exhibit much lower pore size than conventional plates made from metal powder compacts.

The invention includes the further concept that certain metals are readily oxidized and in use as porous plates will tend to build up heavy oxide layers if some fluid permeating the plate is capable of entering into oxidation reaction with the metal. This tendency is used to advantage to control pore size by leaching the pores to remove oxide and re-oxidizing and releaching as necessary to achieve a desired size on a controllable basis.

The invention encompasses within the term "metal" the use of any metal, metal compound, metalloid, group of metals or alloys that can be vacuum evaporated to produce a deposit having metal-like characteristics of solvent heat and abrasion resistance and strength and hardness compared to, say, plastics. By simultaneously evaporating more than one metal, an alloy plate can be made.

The term "pore size" as used herein refers to a minimum limiting dimension which is width in the case of a rectangular section pore and diameter in the case of a circular cross-section pore. A "pore" is a passage in a plate running through the thickness dimension of the plate and may be formed by a series of interconnected passages. "Plate" includes plates which are flat or curved, supported or unsupported, and are used with or without additional layers or coatings adhered thereto.

SPECIFIC DESCRIPTION

The invention is now specifically described with reference to the accompanying drawings wherein.

Figure 1:
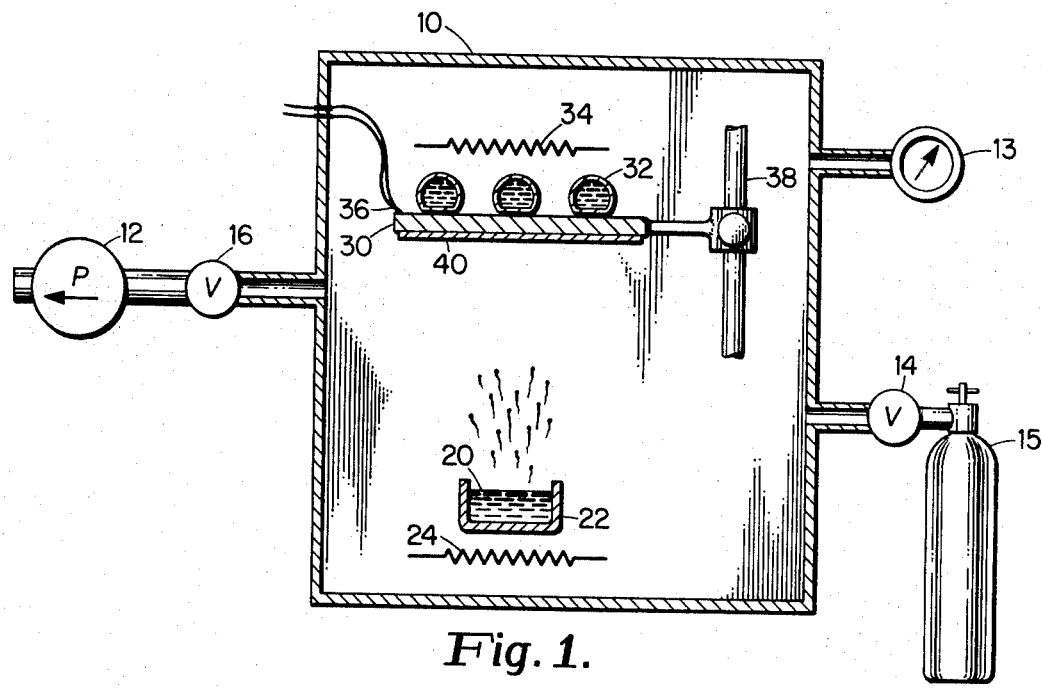
FIG. 1 is a schematic view of apparatus used in practicing the method of the invention.

Referring now to FIG. 1, the apparatus consists of an ordinary vacuum chamber 10 with its pumping system 12 and vacuum gague 13. A valve 14 is provided so that a suitable gas such as air, nitrogen or argon can be admitted to the chamber from a cylinder 15 as to maintain the vacuum at the desired level. Valve 16 to the pumping system can also be used to regulate the vacuum in the chamber. The metal 20 to be evaporated is contained in a boat or crucible 22 which is heated by a resistance or induction heater 24. The substrate material 30 can be disposed in the chamber and backed with cooling coils 32 through which water or gas can be passed and with an electrical resistance heater 34. A thermocouple 36 is attached to the substrate for monitoring its temperatures. The substrate 30 is shown mounted on an adjustable carriage 38 so that its distance from the source can be controlled. While the substrate here is shown as a flat plate, it can be any shape. Depending on the final size and shape desired, the substrate could be a rotating drum, a concave curved surface, or any other form familiar to those skilled in the art of vacuum coating. The deposited coating is indicated at 40.

Figure 2:
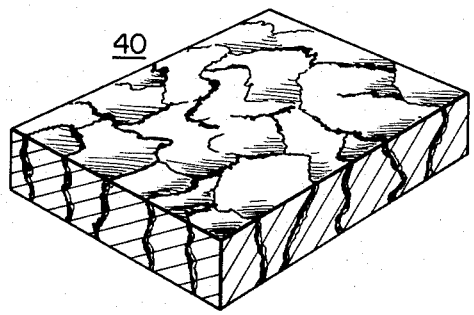
FIG. 2 is a schematic sketch of a porous plate product according to the invention.

FIG. 2 is a schematic of the final porous plate. This shows the porosity to be due to fine microcracks that run through the thickness of the sheet. To some extent these microcracks appear similar to grain boundaries when looking at the surface of the sample.

Figure 3:
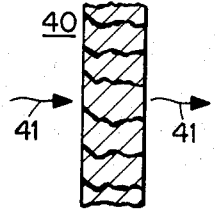
FIGS. 3–5 are schematic sectional diagrams of products according to the invention.

FIG. 3 shows a schematic cross-section of the porous plate. As can be seen, the microcrack pores run through the sheet. By changing the deposition parameters, a dual structure material can be prepared. The arrows 41 indicate fluid flow through the plate.

Figure 4:
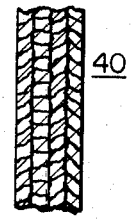

FIG. 4 shows a schematic cross-section of a plate that contains pores in all directions. Such a structure can be obtained by periodically discontinuing the deposition.

Figure 5:
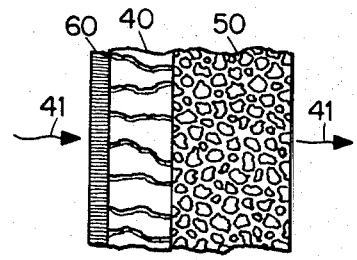

FIG. 5 shows a microporous evaporated plate 40 which has been deposited upon a porous sintered metal plate 50 and upon which an organic (e.g., cellulose acetate) reverse osmosis membrane 60 has been placed.

Figure 6:
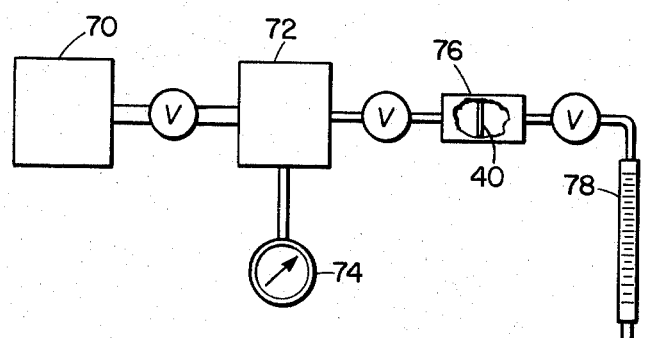

FIG. 6 is a schematic of the permeability test apparatus used. A ¾ inch specimen disk of a sheet 40 was cut and mounted in a vacuum coupling 76. The actual test area is ¼ inch diameter. A vacuum was pulled on one side of the disk by the pump 70 through a conventional vacuum valve system 72 and gauges 74. On the other side was mounted a flow meter 78 which was open to the atmosphere. Most of the sheets tested would withstand over 15 psi on the ¼ inch unsupported area without bursting. A flow rate of 1 cc/minute was equivalent to about 0.1 ft³ air/ft² area/minute. Depending upon the thickness and porosity, the porous materials of interest in this invention would have permeabilities of 1 to 50 millidarcy for air flow, where, $$K = \frac{qH}{A(\Delta P/L)}$$

and
 $K$ = specific permeability
 $q$ = fluid flow rate
 $H$ = viscosity of fluid
 $A$ = cross-section area
 $\Delta P$ = pressure differential
 $L$ = thickness Test results are given for air. However, the plates produced were likewise permeable to water.

Figure 7:
FIGS. 7–9 are photomicrographs of such products.
Figure 8:
Figure 9:

FIGS. 7–9 are actual electron micrographs of the surface of the porous membranes. These show the type of pore obtained. The magnification is 15,020 times for FIG. 7, 31,700 times for FIG. 8 and 43,500 times for FIG. 9. The light side of the sheet is viewed in FIG. 9 and the dark side (towards the substrate) in FIGS. 7–8.

EXAMPLE 1

A 4-foot diameter vacuum chamber, with more than adequate pumping capacity was used. A 0.020 inch thick, 1 square foot sheet of brass was used as a substrate; this was located 27 inches above the crucible. The aluminum to be evaporated was contained in a four inch diameter dish shaped graphite crucible which was induction heated. The deposition was carried out for 24 minutes at a vacuum of $5 \times 10^{-3}$ torr with a source temperature of 1,235° C. and a substrate temperature of 200° C. After cooling the system and venting to air, the substrate and deposit were removed. The plate was removed from the substrate by flexing the brass. The one square foot porous aluminum sheet was 0.0015 inch thick. In the case of the sheet produced in this run, a flow rate of 4 cc/minute was obtained.

EXAMPLE 2

A 9 × 12 inch sheet of 60 mil stainless steel was used as the substrate. The sheet was located 27 inches above the graphite crucible. Copper was evaporated at a temperature of 1,420° C. under a vacuum of $2 \times 10^{-3}$ torr for 47 minutes. The 0.0035 inch thick porous sheet was readily removed from the substrate. A flow rate of 5.5 cc/minute was obtained in the test.

EXAMPLE 3

The 5 × 12 × 0.017 inch brass sheet substrate was placed 27 inches from the aluminum evaporation source, which was at 1,235° C. The evaporation was carried out at about $1 \times 10^{-3}$ torr for 4 minutes. The 0.001 inch sheet recovered had a flow rate of about 5 cc/minute. This sheet was soaked in concentrated nitric acid for an hour, rinsed, dried, and retested. The flow rate had increased 2½ times.

It was found important that the surface of the substrate be very smooth and scratch-free. Otherwise, it was extremely difficult to remove the deposited porous sheet. The source to substrate distance can be varied widely, depending upon the permeability desired. The shorter the distance, the more rapid the deposition; the greater the distance, the easier to maintain substrate temperature. The deposition time can be varied from a few minutes to a few hours. Some apparently very porous, permeable films were made with only a 3–4 minute run time; these were so thin and fragile that they could not be handled without breaking. Of course, these would be very useful as reverse osmosis layers, per se, if deposited directly on the desired large pored back-up plate. The evaporation pressure can be maintained from $1 \times 10^{-3}$ torr to $50 \times 10^{-3}$ torr.

For obtaining suitable porous sheets the controlling factors are:

1. Substrate temperature — between about 150° C. to about one-half the melting point of the metal;
2. Source temperature — controls the evaporation rate of the particular metal;
3. Deposition time — controls the thickness of the plate;
4. Vacuum — effects the evaporation rate and the nature of the deposits. At pressures much under $1 \times 10^{-3}$ torr a non-porous plate is obtained; at pressures over $50 \times 10^{-3}$ torr a powdery deposit is expected;
5. Substrate surface — if polished and without scratches, plate can be removed.
6. Substrate distance from source It must be understood that there is interaction between the above factors. Depending upon the desired result these can be varied to give more or less permeability, thicker or thinner sheets, adherent or non-adherent sheets. Those skilled in the art will be able to vary the conditions for particular metals so as to obtain resultant porous plate. Under varying conditions sheets were obtained less than 0.0005 inches thick to over 0.25 inches thick.

In the case of readily oxidizable metals, e.g., aluminum, the large surface area in the pores readily oxidizes upon exposure to air. By selecting a medium that dissolves the oxide but not the metal, e.g., concentrated nitric acid for aluminum, the pores size can be enlarged. For metals not so readily oxidizable, the pore size can be adjusted, i.e., decreased by heating the sheet while passing air or oxygen through it in order to oxidize the surfaces of the pores.

Several variations can be made within the scope of the present invention by those skilled in the art once given the benefit of the present disclosure. Accordingly it is intended that the foregoing specification and accompanying drawings shall be read as illustrative and not in a limiting sense.

What is claimed is:

1. The method of producing a porous sheet structure usable as a fluid — permeable, porous plate element in filtering, sorption, reverse — osmosis back-up plates, fuel cell electrode and like applications, comprising the steps of:

a. placing a substrate and a metal in a vacuum chamber having a pressure between $1 \times 10^{-4}$ mm. Hg. and $1 \times 10^{-2}$ mm. Hg, the metal being a material which is capable of being vacuum evaporated and the substrate having a wide area smooth surface, the metal and substrate being placed in opposing relationship in the vacuum chamber and spaced from each other therein;

b. heating the metal to evaporate it to cause the vapor so formed to travel to the substrate and condense thereon and heating the substrate at a temperature selected as too high for powdery coating formation and too low for equiaxed grain formation in the coating formed by the condensing vapors on said substrate surface, c. the coating and condensation conditions being controlled to produce a sheet-form coating of at least 0.0005 inches thick and no greater than 0.02 inches thick, the sheet-form coating structure having a columnar structure with pores in the form of elongated crevass-like gaps at the grain boundaries, with a maximum width of such gap of no greater than 0.1 microns.

2. The method of claim 1 comprising the further steps of:

d. controllably oxidizing the metal at the crevass-like gaps and leaching said oxide to adjust pore size to a desired value and thereby adjust permeability of the sheet.

3. The method of claim 1 further comprising the step of stripping the coating from the substrate.

* * * * *